United States Patent
Martin et al.

(10) Patent No.: US 7,443,960 B2
(45) Date of Patent: *Oct. 28, 2008

(54) METHOD AND SYSTEM FOR AN AUTOMATED DEPARTURE STRATEGY

(75) Inventors: John M. Martin, Austin, TX (US); Hisao M. Chang, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,147

(22) Filed: May 8, 2006

(65) Prior Publication Data

US 2006/0193449 A1 Aug. 31, 2006

Related U.S. Application Data

(63) Continuation of application No. 10/777,877, filed on Feb. 12, 2004, now Pat. No. 7,062,018, which is a continuation of application No. 10/285,112, filed on Oct. 31, 2002, now Pat. No. 6,714,631.

(51) Int. Cl.
*H04M 1/64* (2006.01)

(52) U.S. Cl. ............................. 379/88.02; 379/218.01; 704/257; 707/3; 707/104.1; 709/219

(58) Field of Classification Search ................ 379/67.1, 379/218.01, 88.01, 88.02; 707/10, 3, 104.1; 704/257; 709/219
See application file for complete search history.

(56) References Cited

U.S. PATENT DOCUMENTS

| | | | |
|---|---|---|---|
| 4,959,855 A | 9/1990 | Daudelin | 379/213 |
| 4,979,206 A | 12/1990 | Padden et al. | 379/67 |
| 5,479,488 A | 12/1995 | Lennig et al. | 379/67 |
| 5,638,425 A | 6/1997 | Meador, III et al. | 379/88 |
| 5,758,322 A | 5/1998 | Rongley | 704/275 |
| 5,812,638 A | 9/1998 | Muller | 379/88 |
| 5,917,889 A | 6/1999 | Brotman et al. | 379/88.01 |
| 5,917,890 A | 6/1999 | Brotman et al. | 379/88.01 |
| 5,987,408 A | 11/1999 | Gupta | 704/231 |
| 5,987,414 A | 11/1999 | Sabourin et al. | 704/270 |
| 6,243,684 B1 | 6/2001 | Stuart et al. | 704/275 |
| 6,421,672 B1 * | 7/2002 | McAllister et al. | 707/10 |
| 6,427,006 B1 | 7/2002 | Reding et al. | 379/201.01 |
| 6,430,285 B1 | 8/2002 | Bauer et al. | 379/265.01 |
| 6,466,784 B1 | 10/2002 | Cox et al. | 455/414 |

(Continued)

*Primary Examiner*—Gerald Gauthier
(74) *Attorney, Agent, or Firm*—Joseph P. Lally; Jackson Walker L.L.P.

(57) ABSTRACT

A method and system for an automated departure strategy from an automated system includes a track engine and an error engine. The track engine allows for the tracking and storing of one or more utterances spoken by a caller in response to one or more prompts. In addition, the track engine classifies each of the utterances with a confidence level. The error engine determines when one of the utterances initiates an error condition and transfers the caller to an operator on the occurrence of the error condition. In addition to transferring the caller to the operator, the error engine plays to the operator an error utterance, causing the error condition, and a preceding utterance, preceding the error utterance. Furthermore, the error engine populates an operator screen with information provided by the caller in the utterances for utterances classified with a high level of confidence.

13 Claims, 7 Drawing Sheets

U.S. PATENT DOCUMENTS 6,792,096 B2 9/2004 Martin et al. .......... 379/218.01
6,925,154 B2 8/2005 Gao et al. ................ 379/88.03
6,999,563 B1 * 2/2006 Thorpe et al. .............. 379/67.1

* cited by examiner

METHOD AND SYSTEM FOR AN AUTOMATED DEPARTURE STRATEGY

RELATED APPLICATION

This application is a continuation of U.S. patent application Ser. No. 10/777,877 filed Feb. 12, 2004, now U.S. Pat. No. 7,062.018, which is a continuation of U.S. patent application Ser. No. 10/285,112 filed Oct. 31, 2002, now U.S. Pat. No. 6,714,631, which was co-pending with U.S. patent application Ser. No. 10/285,597, filed Oct. 31, 2002, the contents of which are hereby incorporated in their entirety by reference.

TECHNICAL FIELD OF THE INVENTION

The present invention relates generally to telecommunications systems, and more specifically relates to a method and system for an automated departure strategy.

BACKGROUND OF THE INVENTION

In order to decrease costs and increase efficiency, telephone companies are automating directory assistance systems. An early step toward automation of directory assistance was the use of store and forward technology to assist live operators. A caller was asked for a locality by a pre-recorded prompt. The store and forward system stored a compressed version of the caller's response to the prompt, and brought a live operator onto the line. The operator heard the compressed version of the response and then completed the remaining dialogue with the caller to provide a unique telephone number.

With the advent of speech recognition, companies have begun adding speech recognition capabilities to directory assistance systems. Automated speech recognition recognizes a locality from the caller's response to a prompt for locality. In a typical system, if the speech recognition is successful, the system prompts the caller for the listing name, puts an operator on the line, populates the operator's workstation display with the recognized locality, and plays a recorded compressed version of the caller's response to the listing question. The operator then conducts the remaining dialogue, searches for the listing, and provides the unique telephone number to the caller. But directory assistance is not totally automated and operator involvement is still required in providing the callers telephone numbers.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
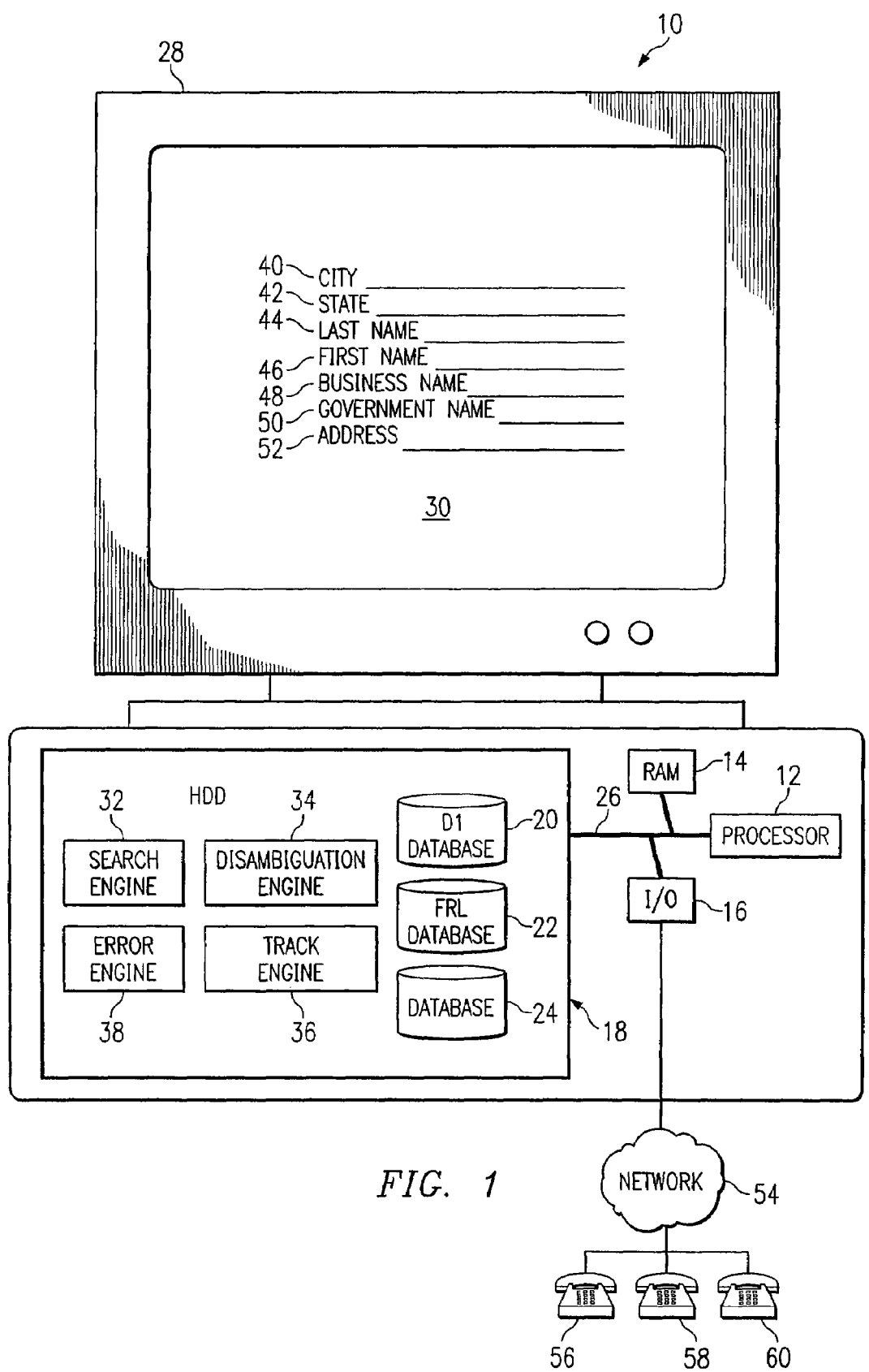
FIG. 1 depicts a block diagram of an automated directory assistance system.

Preferred embodiments of the present invention are illustrated in the figures, like numerals being used to refer to like and corresponding parts of the various drawings.

Telephone companies typically have directory assistance systems allowing for callers seeking particular telephone information to receive such information. Callers typically call directory assistance to receive a telephone number for a particular person or business or to locate a corresponding name and address for a telephone number. Generally the caller calls into directory assistance and interacts with a live operator. The operator asks the caller various questions such as the locality (city and state) for the person or business that the caller seeks, the name of the person or business, and possibly the address of the person or business. The caller engages in a dialogue with the operator answering all of the operator's questions until the operator has enough information to perform a database search for the desired telephone number. If the database search returns one record, the operator provides the telephone number to the caller either verbally or more typically by means of a "backend" audio system that utilizes wave files or synthesized human speech. If the database search returns more than one record, the operator asks the caller additional questions in order to eliminate all but the desired returned record. Once the operator has determined the desired returned record, the operator provides the telephone number to caller.

Operator assisted directory assistance systems, while efficient at locating the desired record and providing a positive caller experience, are costly to the telephone companies due to the costs involved with the operator time and man-power required to interact with the callers. Callers expect a quick response when calling directory assistance and do not like to wait or be put on hold. Hence, there must be enough operators working at all times of the day to insure that the majority of callers can quickly and easily speak with an operator and find the desired telephone number.

In order to increase efficiency and defray some of the costs associated with directory assistance systems, telephone companies have begun to automate various aspects of the directory assistance systems using a variety of automation techniques. Initially, telephone companies adopted store and forward technology to record the response of a caller and playback the response to an operator. For instance, a prerecorded prompt asked a caller for the city and state for the desired telephone number. The caller speaks the city and state and the store and forward technology records the caller's response. The recorded city and state is then played for the operator and the caller is transferred to the operator so that the operator can ask the caller additional questions about the desired telephone number, perform the search for the telephone number, and provide the telephone number to the caller.

Telephone companies further automated directory assistance systems with the use of speech recognition capabilities. As with store and forward, the directory assistance system uses a prerecorded prompt to ask the caller for the locality and the caller speaks the city and/or state. If the directory assistance system successfully recognizes and understands the caller's utterance, the caller's utterance is recorded and another prerecorded prompt plays asking the caller for the listing name. When the caller speaks the listing name, the directory assistance system records the listing name, populates an operator screen with the recognized locality, and plays back to the operator the recorded listing name. The caller is then transferred to the operator where the caller and operator continue the remaining dialogue and the operator performs a database search and provides the desired telephone number to the caller.

Typically, the directory assistance systems are not completely automated because the callers must still interact with live operators and operators still perform the database searches in order to locate the desired telephone number. In addition, the likelihood of failed speech recognition requires that the directory assistance systems be capable of defaulting to an operator upon such a failure. Generally, the call defaults to a live operator after a failed attempt at speech recognition. In addition, further operator and caller involvement is required when a database search returns more than one record and the operator must disambiguate between the returned records so that the caller receives the desired telephone number.

Telephone companies have attempted to increase the automation by utilizing speech recognition deeper into the operator and caller dialogue. But speech recognition success rates and the callers' opinions towards speech recognition systems have slowed the automation of directory assistance systems utilizing speech recognition. Typically when the directory assistance system utilizing speech recognition does not understand an utterance of the caller, the system asks the caller to repeat the utterance. But callers do not like having to repeat themselves when interacting with speech recognition systems and quickly grow frustrated and dissatisfied with directory assistance systems if they constantly have to repeat themselves. In addition, if the speech recognition is not functioning correctly and the call defaults to the operator, the operator generally does not know what the caller has been trying to accomplish and must re-ask questions that the caller has already answered or attempted to answer when interacting with the automated system utilizing speech recognition. Therefore, the caller becomes even more frustrated and dissatisfied because the caller now has to repeat utterances to the operator.

By contrast, the example embodiment described herein allows for an automated directory assistance system including automated disambiguation strategy of search results utilizing speech recognition. The example embodiment allows for the disambiguation of returned telephone records without the intervention of a live operator. Time and money is saved because operators are no longer required to interact with callers to disambiguate the returned records when more than one record satisfies one or more search terms provided by the caller with respect to the desired telephone number. Therefore, employees' and operators' time may be better utilized in interacting with callers experiencing difficulties as well as in other revenue generating projects since less man-power is required to disambiguate returned records in the directory assistance system.

Referring now to FIG. 1, a block diagram depicts directory assistance system 10. In the example embodiment, directory assistance system 10 may include respective software components and hardware components, such as processor 12, memory 14, input/output ports 16, hard disk drive (HDD) 18 including databases 20, 22, and 24, and those components may work together via bus 26 to provide the desired functionality. In alternate embodiments, HDD 18 may contain more than three or less than three databases. The various hardware and software components may also be referred to as processing resources. Directory assistance system 10 may be a personal computer, a server, or any other appropriate computing device. Directory assistance system 10 may further include display 28 for presenting operator screen 30 and input devices such as a mouse and a keyboard. Directory assistance system 10 also includes search engine 32, disambiguation engine 34, track engine 36, and error engine 38, which reside in memory such as HDD 18 and are executable by processor 12 through bus 26. Directory assistance system 10 may further include an automated speech recognition (ASR) engine and a text to speech (TTS) engine that enable directory assistance system 10 to utilize a speech recognition interface with the callers. The ASR engine allows directory assistance system 10 to recognize the speech or utterances provided by the callers in response to prompts while the TTS engine allows directory assistance system 10 to playback to the callers in prompts variable data, such as data returned from a database search.

Display 28 presents operator screen 30 which allows for the input of various search terms into directory assistance system 10 to automatically disambiguate and for automated departure to an operator upon an error. Shown in FIG. 1 is an example operator screen 30. Operator screen 30 includes seven information fields 40, 42, 44, 46, 48, 50, and 52 allowing for the individual input of various specific caller utterances and search terms such as locality (city field 40 and state field 42), name (last name field 44, first name field 46, business name field 48, and government name field 50), and address field 52. In alternate embodiments, operate screen 30 may include more than seven or less than seven information fields and the information fields may be for different information than those shown in FIG. 1.

The callers interface with directory assistance system 10 using telephones 56, 58, and 60. Telephones 56, 58, and 60 communicate with directory assistance system 10 via network 54 and I/O port 16. Network 54 may be a public switched telephone network, the Internet, or any other appropriate type of communication network. Although three telephones 56, 58, and 60 are shown in FIG. 1, in alternate embodiments directory assistance system 10 may interface with more than three or less than three telephones.

Directory assistance system 10 allows for the automated searching and returning of telephone directory information such as telephone numbers, listing names, and listing addresses. Although the example embodiment is described in reference to automated speech recognition as the interface between directory assistance system 10 and the callers, in alternate embodiments the callers may also interface with directory assistance system 10 utilizing touch-tone input, a combination of speech recognition and touch-tone, or any other appropriate method of interfacing.

Figure 2A:
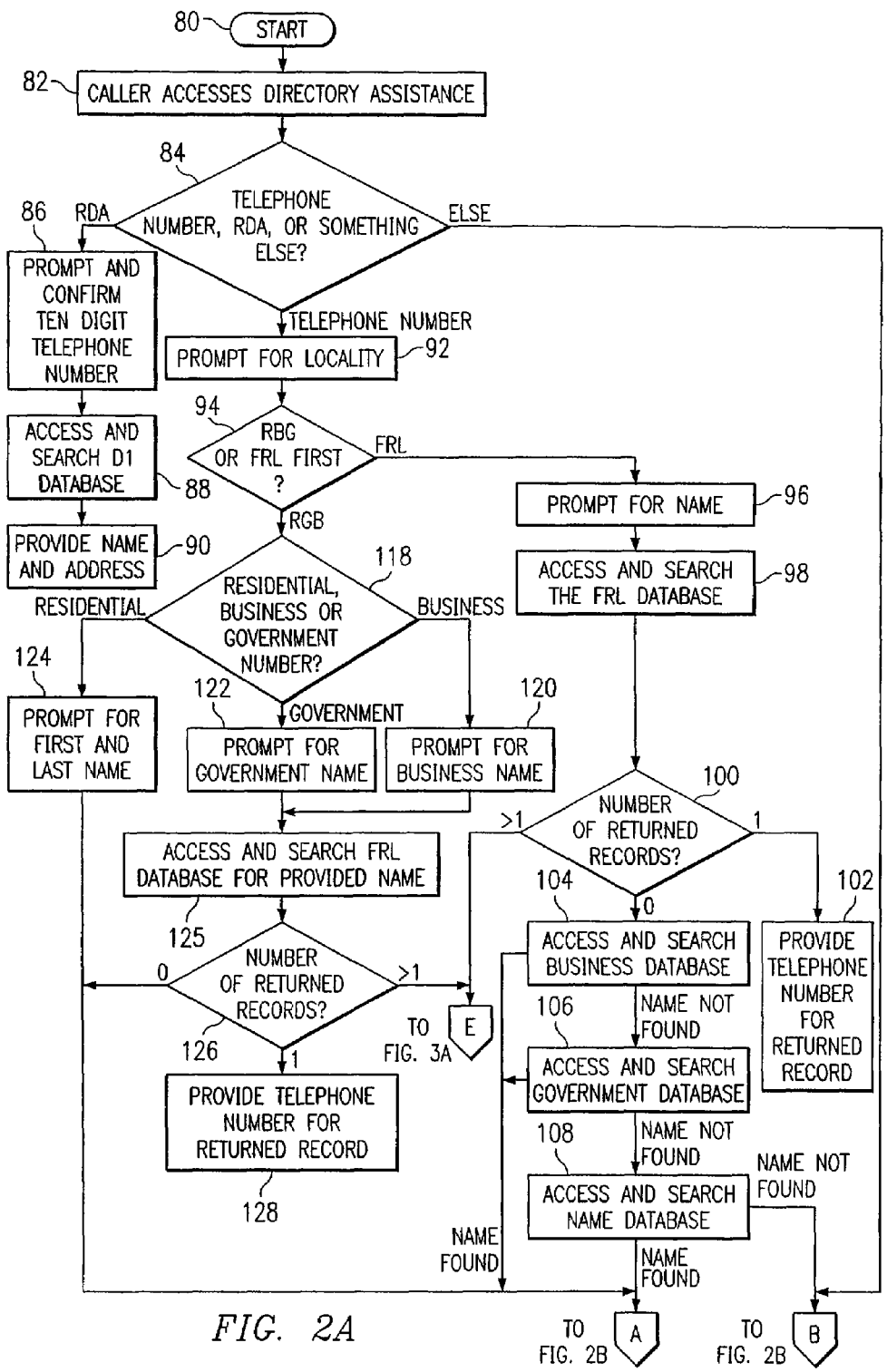
FIG. 2 illustrates a flow diagram of a method for the automated disambiguation of search results and automated defaulting to an operator in the directory assistance system.
Figure 2B:
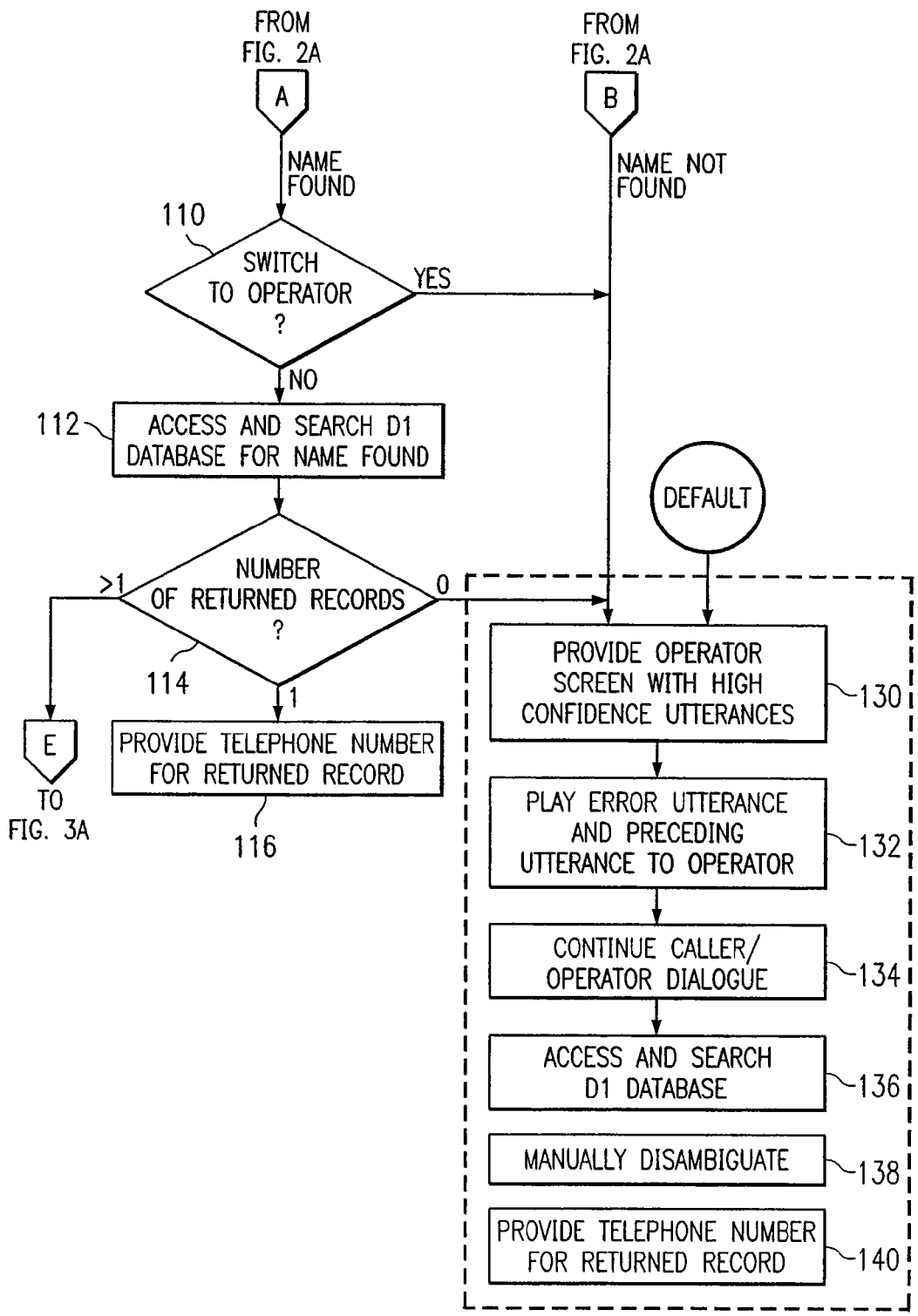
Figure 3A:
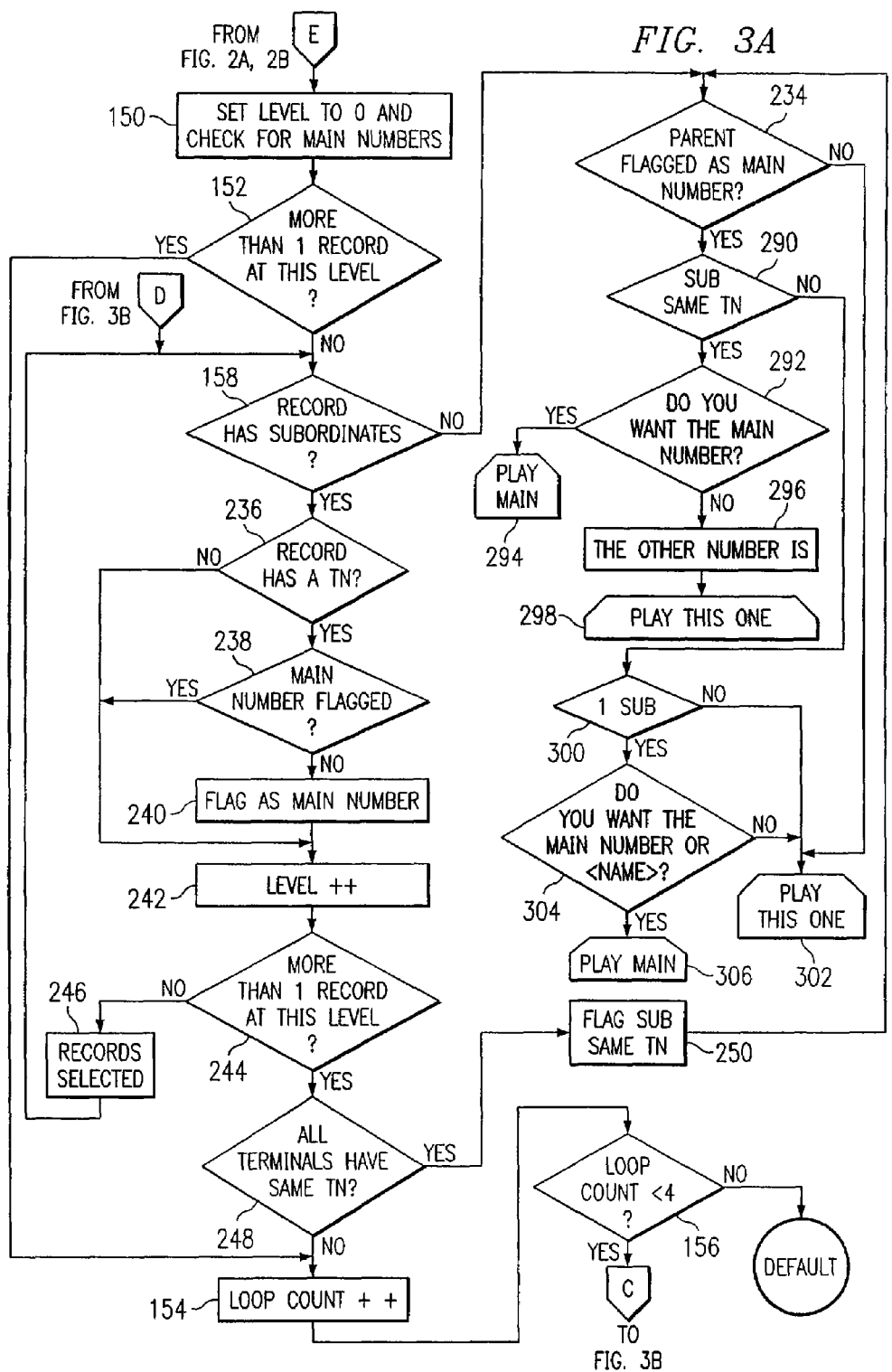
FIG. 3 depicts a flow diagram of a method for automated disambiguation in greater detail.
Figure 3B:
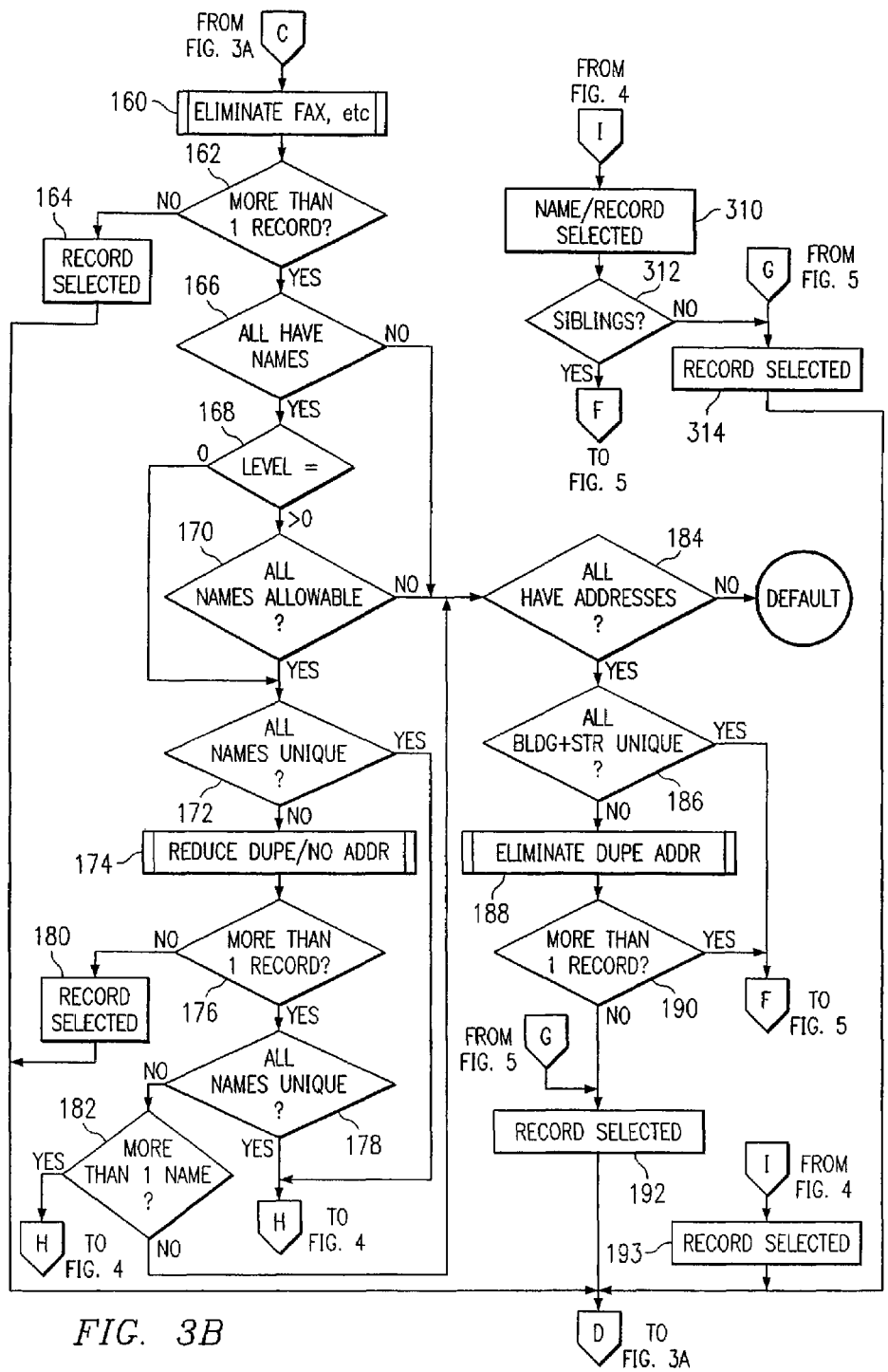
Figure 4:
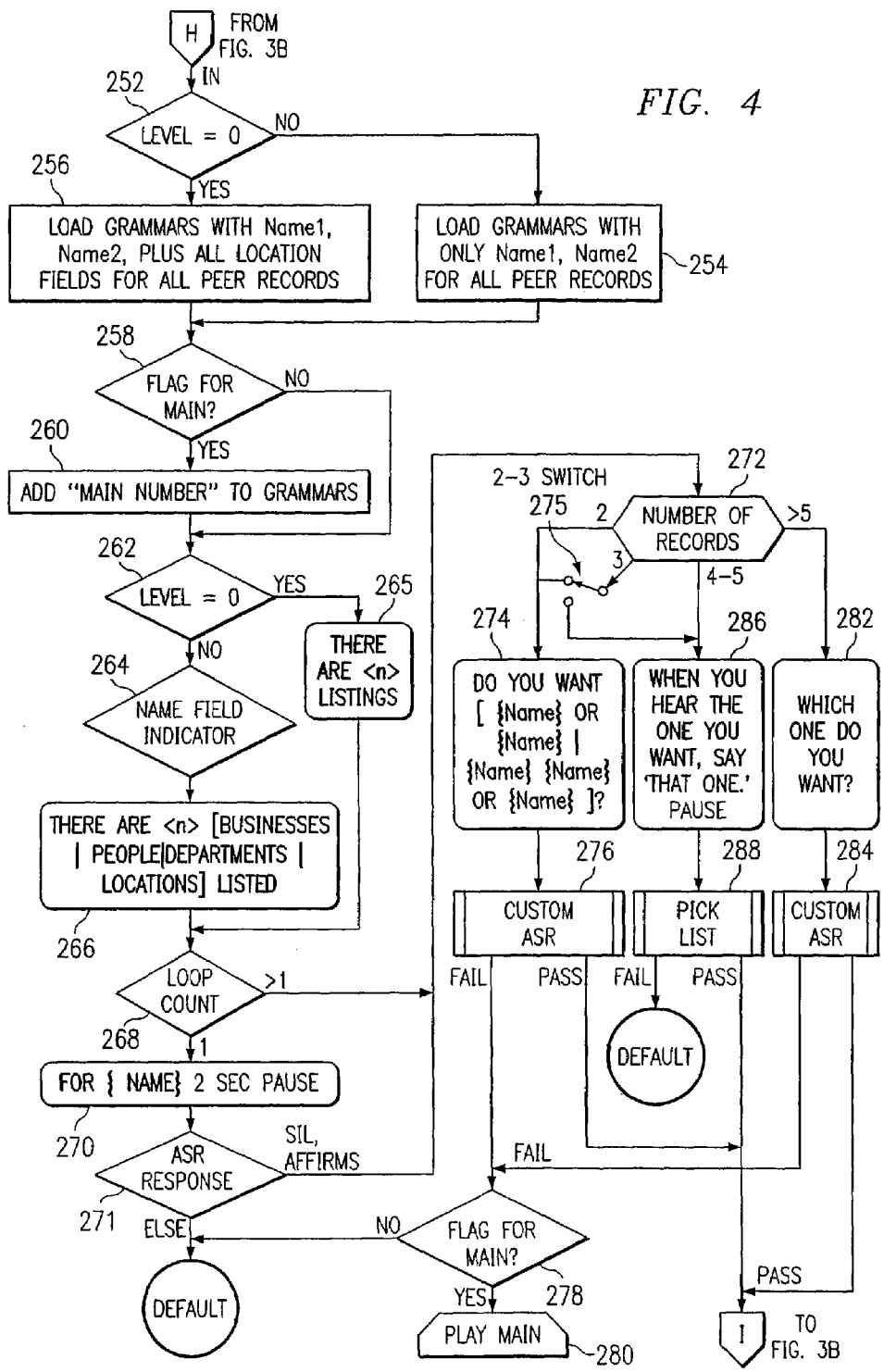
FIG. 4 illustrates an example flow diagram of a method for automated disambiguation by record name.
Figure 5:
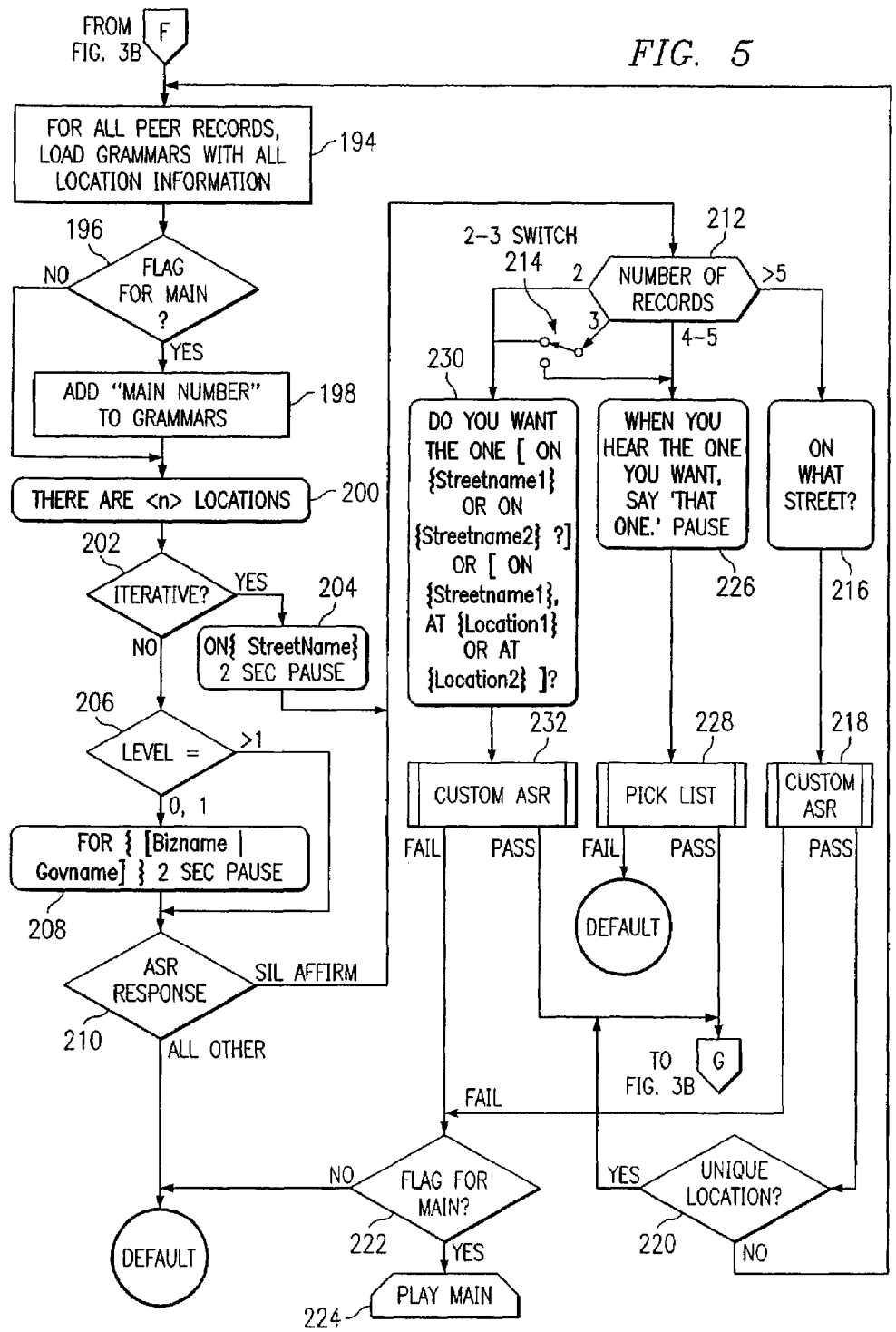
FIG. 5 depicts an example flow diagram of a method for automated disambiguation by record address.

FIG. 2 illustrates a flow diagram of a method for the automated disambiguation of search results in directory assistance system 10 and automated defaulting to an operator within directory assistance system 10. FIGS. 3, 4, and 5 provide more detail with respect to the automated disambiguation strategy.

The method begins at step 80 and at step 82 a caller accesses directory assistance system 10 by calling a telephone number for directory assistance such as "1+411." In response to the caller dialing directory assistance, a dialog with the caller begins between the caller and directory assistance system 10 utilizing automated speech recognition. At any step, if the speech recognition is not successful, the call defaults to a live operator where such defaulting to the operator is described in greater detail below.

At step 84, directory assistance system 10 prompts the caller by playing a prompt asking the caller if the caller is interested in locating a telephone number where the caller has a name, performing a reverse directory assistance ("RDA") look-up where the caller has a telephone number and wants to determine a corresponding name and address, or if the caller is interested in something else. In response to the prompt, the caller speaks a response or utterance depending on the caller's reason for calling directory assistance. For example, if the caller is interested in finding a telephone number, the caller says "telephone number" in response to the prompt. Whenever the caller responds to any prompt, track engine 36 tracks and stores the caller's response or utterance in database 24. For example, if at step 84 the caller's utterance is "telephone number" in response to the prompt, track engine 36 stores "telephone number" in database 24.

If at step 84 the caller responds that he is interested in an RDA look-up, then at step 86 directory assistance system 10 prompts the caller for the telephone number including area code. The caller speaks the telephone number and directory assistance system 10 confirms the telephone number. Once directory assistance system 10 successfully recognizes the ten digit telephone number, at step 88 directory assistance system 10 accesses and searches D1 database 20 in order to locate a name and address that correspond with the telephone number provided by the caller. D1 database 20 is a real world directory of names, addresses, and telephone numbers for individuals, businesses, and the government created and maintained by Nortel Networks Limited. Whenever a search is performed in D1 database 20, the search terms used to search D1 database 20 have already been successfully recognized utilizing an ASR engine. Although D1 database 20 is shown within directory assistance system 10 in the embodiment of FIG. 2, in alternate embodiment D1 database 20 may be remotely located remotely with respect to directory assistance system 10 and accessed via a network connection. Furthermore, directory assistance system 10 may search other name, address, and telephone number databases in place of or in addition to D1 database 20.

If at step 88 directory assistance system 10 locates a corresponding name and address, directory assistance system 10 checks a non-publication list and if the telephone number is not on the non-publication list provides the name and address to the caller. The non-publication list is a list of telephone customers who have paid a fee so that their name, address, and telephone number will not be given out to callers by directory assistance. Before directory assistance system 10 provides any telephone information to the caller, directory assistance system 10 must always first check to see if the information is for an entity that is on the non-publication list. If the telephone number is on the non-publication list, directory assistance system 10 informs the caller that the owner of the telephone number has requested that their information not be provided and therefore does not provide the corresponding name and address to the caller. If there is no corresponding name and address, directory assistance system 10 informs the caller that no name and address matches the telephone number provided and directory assistance system 10 may end the call, provide a different telephone number, or default to the operator.

If at step 84 the caller wants something else besides a telephone number or a RDA look-up, track engine 36 tracks and stores the caller's utterance and then the caller is transferred to a live operator so that the operator may assist the caller with the inquiry.

If the caller wants to find a telephone number at step 84, then at step 92 the caller is prompted for the locality of the entity for which the caller seeks the telephone number. Depending on what information number the caller calls, the caller may be prompted for both the city and state or just the city. The caller responds to the prompt for locality by speaking the city and/or state and track engine 36 tracks and stores the caller's utterance. At step 94, directory assistance system 10 must determine if the search for the telephone number is going to initially proceed through frequency requested database ("FRL") database 22 using only a name provided by the caller or if directory assistance system 10 prompts the caller for additional information regarding the type of entity for the telephone number sought such as residential, business, or government ("RBG") before searching FRL database 22.

FRL database 22 is a database created and maintained by directory assistance system 10. FRL database 22 includes telephone listings that are frequently requested by callers accessing directory assistance. Directory assistance system 10 monitors the records provided to the callers and how frequently each record is requested by the callers in order to determine a frequency of request for each record. The records requested the most are stored in FRL database 22 for quick access and thereby allow directory assistance system 10 to quickly and easily provide the telephone number to the caller when the caller requests information for a record in FRL database 22. In the embodiment shown in FIG. 2, FRL database 22 is located within directory assistance system 10. In alternate embodiments, FRL database 22 may be remotely located with respect to directory assistance system 10 and accessed via a network connection.

FRL database 22 may be partitioned with respect to the record type in order to shorten search times. For example, records for businesses may be stored in one partition of FRL database 22 while records for government listings may be stored in a different partition of FRL database 22. This allows for quicker search times when search engine 32 has the record type as one of the search terms. If search engine 32 is looking for a business listing, search engine 32 searches just the business record partition of FRL database 22 and only searches the business records in FRL database 22. Therefore time is not wasted searching the government records when directory assistance system 10 is already aware that the caller is only interested in a telephone number for a business entity.

When records are added to FRL database 22, directory assistance system 10 adds an indicator to each record to indicate whether the name in the record is for a family name, a business name, a department name, or any other appropriate type of name pertaining to a telephone listing. In addition, FRL database 22 may only include business and government listing records and not residential listing records due to callers generally requesting a telephone number for a business or government entity when accessing directory assistance and infrequently requesting a residential telephone number.

Whether directory assistance system 10 follows the FRL route or the RBG route depends on the goals and level of caller satisfaction desired by the owner and operator of directory assistance system 10. The RBG route allows for an additional caller prompt versus the FRL route where the additional prompt extracts from the caller if the desired telephone number is for a business, government office, or residence. With the additional information, search engine 32 has a narrower search space, a quicker search, and returned records that are more likely to correctly satisfy the search terms. For example, the caller is prompted for business, residential, or government. If the caller responds "business," then search engine 32 searches only the business partition of FRL database 22 and does search any of the government or residential records. Typically caller satisfaction decreases with each additional prompt that the caller has to respond to. Therefore the RBG route trades lower caller satisfaction for quicker and more accurate searches.

The FRL route, on the other hand, offers one less prompt versus the RBG route which correlates to greater caller satisfaction but less accurate searching. The FRL route prompts the caller for the desired name and begins a search for records matching the provided name without asking the caller if the name is for a business, government office, or a residence. Because the FRL route includes one less prompt than the RBG route, search engine 32 has less search terms to search with (name only and no entity type) and therefore the search space is much broader than the search space in the RBG route. For example, search engine 32 searches both the business and government partitions of FRL database 22 for the name provided by the caller. The larger search space and fewer search terms result in a greater chance of returning a returned record that does not correctly satisfy the search terms. The FRL route and RBG route allow for owners and operators of directory assistance systems to customize their directory assistance systems with respect to their callers and business goals based on caller satisfaction levels, search times, and accuracy of searches.

If at step 94 directory assistance system 10 follows the FRL route, then at step 96 the caller is prompted for the name of the entity for which the caller desires the telephone number. Track engine 36 stores the caller's utterance regarding the name and at step 98 search engine 32, using the name provided by the caller as well as the locality information provided by the caller at step 92 as search terms, searches FRL database 22 for any records that satisfy the name and locality provided by the caller.

At step 100, search engine 32 returns a number of records that satisfy the search the terms. The number of returned records can be zero, one, or more than one where a returned record is a record satisfying the search terms including a single name and single telephone number. If a returned record includes a name followed by departments or divisions each having a unique telephone number, then that returned record is considered as more than one returned record. For example, if a search for "Steve's Grocery" returns the following record, the returned record for "Steve's Grocery" is considered as more than one returned record because of the multiple names and telephone numbers.

| Steve's Grocery | 549 Bull Creek | 512-555-2522 |
|---|---|---|
| Deli | | 512-555-2533 |
| Produce | | 512-555-2544 |

If only one record satisfies the search terms at step 100, then at step 102 directory assistance system 10 checks to see if the returned record is on any non-publication lists and if not, provides the telephone number for the returned record to the caller. In addition to the telephone number, directory assistance system 10 may also provide the name and address of the returned record to the caller. For instance, if the caller wanted the number for "Bob's Wholesale Tools," when providing the telephone number directory assistance system 10 may provide the telephone number by stating, "The telephone number for Bob's Wholesale Tools at 2341 54$^{th}$ Street is 555-1475." Providing the name and address in addition to the telephone number implicitly confirms to the caller that he is receiving the correct telephone number especially in situations where the caller has not provided any address information. Furthermore, it provides assurances to the callers who are sometimes uneasy in dealing with fully automated systems because they know they are getting the correct telephone number for the right location.

If at step 100 search engine 32 returns more than one record satisfying the search terms, then the process continues to FIG. 3 where directory assistance system 10 automatically disambiguates the returned records. This process is described below in greater detail with respect to FIGS. 3, 4, and 5.

If at step 100 search engine 32 finds zero records satisfying the search terms, then search engine 32 accesses and searches one or more name databases in order to locate a name corresponding with the name provided by the caller at step 96. The name databases include names only and do not include any telephone listing information such as telephone number or address. Such telephone information changes frequently and therefore it is very expensive to constantly update databases containing both names and telephone information. But name information changes less frequently and therefore it is relatively inexpensive to frequently update the name information in the name databases. Search engine 32 utilizes the name databases as grammars when recognition of the name supplied by the caller fails using FRL database 22.

At step 104 search engine 32 accesses a database containing only business names (and not business listings) and searches for any business names satisfying the name provided by the caller at step 96. If search engine 32 locates a business name matching the name provided by the caller, then the process proceeds to step 110. If search engine 32 does not find any business names matching the name provided by the caller, then at step 106 search engine accesses a database containing only government names (and not government listings) and searches for any government names that match the name provided by the caller at step 96. If search engine 32 locates a government name that matches the name provided by the caller, then the process continues to step 110. But if search engine 32 does not locate any government names matching the name supplied by the caller, then at step 108 search engine 32 accesses a database containing only residential names (and not residential listings) and searches for any residential names that matches the name provided by the caller. If search engine 32 locates a residential name then the process continues to step 110. If search engine 32 does not locate a residential name that matches the name provided by the caller at step 108, then the call defaults to a live operator where the procedure for defaulting to a live operator is described in greater detail below.

At step 110, search engine 32 has located a name that matches the name provided by the caller at step 96. Depending on the desired level of automation, at step 110 the caller may default to a live operator or continue interacting with directory assistance system 10. If the caller switches to the live operator, then the live operator assists the caller in locating the desired telephone number and such procedure is described below.

If the caller does not switch to the live operator, then at step 112 search engine 32 accesses and searches D1 database 20 using the name located at step 104, 106, or 108 as the search term. D1 database 20 includes the majority of telephone listings and not just the most frequently requested listing like FRL database 22 so when a search of FRL database 22 does not return any records, a search of D1 database 20 has a greater probability of returning a record. At step 114, search engine 32 determines how many returned records satisfy the search term. If the search of D1 database 20 returns no returned records, then the call defaults to the live operator and the operator assists the caller as described below. If search engine 32 locates more than one returned record, then directory assistance system 10 automatically disambiguates the returned records as described in FIGS. 3, 4, and 5. If search engine 32 locates one returned record, then at step 116 directory assistance system 10 provides the telephone number to the caller in the same manner as described above so long as the returned record is not listed on a non-publication list.

If at step 94 directory assistance system 10 follows the RBG route, then at step 118 directory assistance system 10 prompts the caller to determine if the telephone number the caller is seeking is for a business, a residence, or a government office and the caller provides an utterance in response to the prompt. If the caller utters "business," then at step 120 directory assistance system 10 prompts the caller for the business name. If the caller utters "government," then at step 122 directory assistance system 10 prompts the caller for the government name. If the caller utters "residential," then at step 124 directory assistance system 10 prompts the caller for the first and last name of the person for whom the caller seeks the telephone number.

Where the caller desires a business or government number, then at step 125 search engine 32 accesses FRL database 22 and searches FRL database 22 for the business or government name provided in step 120 or 122. At step 125 search engine 32 searches only a partition of FRL database 22. If the caller desires a telephone number for a business, then search engine 32 searches only the business partition of FRL database 22. If the caller desires a telephone number for a government entity, then search engine 32 searches only the government partition of FRL database 22. If the caller seeks a residential telephone number, then the process continues to step 110 where the caller is either transferred to a live operator or remains in the automated system where search engine 32 accesses and searches D1 database 20 at step 112 for the first and last name provided by the caller at step 124. The caller then continues to step 114 as described above. In alternate embodiments, FRL database 22 includes telephone numbers for residential telephone numbers in addition to business and government listings and a search for the residential first and last name may also be performed in FRL database 22 at step 125 instead of D1 database 20 at step 112.

Search engine 32 searches FRL database 22 for the entity type and name provided by the caller. At step 126, search engine 32 determines how many returned records from FRL database 22 satisfy the search terms. If search engine 32 locates zero returned records, then the process continues to step 110 as described above. If search engine 32 locates more than one returned record, then directory assistance system 10 automatically disambiguates the returned records as described with respect to FIGS. 3, 4, and 5. If search engine 32 locates one returned record satisfying the search terms, then at step 128 directory assistance system 10 provides the telephone number and corresponding information to the caller unless the returned record is listed on a non-publication list.

FIGS. 3, 4, and 5 illustrate a method for automated disambiguation when search engine 32 locates more than one returned record satisfying the search terms. FIG. 3 depicts a flow diagram of the method for automated disambiguation in greater detail. FIG. 4 illustrates an example flow diagram of a method for automated disambiguation by record name. FIG. 5 depicts an example flow diagram of a method for automated disambiguation by record address.

There are many different forms or types of records each having one or more data fields. One record type is a stand-alone or straight line record which includes a name (first and last), address, and telephone number. An example stand-alone record is "Smith, John, 1213 Main Street, 512-555-1234." For the above record, the name data field is "Smith, John" and the address data field is "1213 Main Street." More specifically, "Smith" is the Name1 data field which is for the family name on a residential record and "John" is the Name2 data field which is for the given name on a residential record. Another record type is a straight line under set record which includes both a parent record and one or more child or subordinate records where both the parent record and the child records each have a telephone number. An example straight line under set record is as follows:

| Johnson Auto Mart | 2715 N. Umbridge | 512-555-8700 |
| Sales | | 512-555-8710 |
| Service | | 512-555-8720 |
| Trucks | | 512-555-8730 |
| Used Cars | 2750 N. Umbridge | 512-555-8740 | where "Johnson Auto Mart" is the parent record and "Sales," "Service,", "Trucks," and "Used Cars" are the child or subordinate records. Yet another type of record is a caption set record which includes both a parent record and one or more subordinate records but the parent record does not have a telephone number associated with it and each subordinate record does have a telephone number. An example caption set record is as follows:

| Smith Foods | | |
| Store No. 1 | 125 Main Street | 512-555-8500 |
| Store No. 2 | 7865 Pine | 512-555-9514 |
| Store No. 3 | 7895 N. Research | 512-555-7532 |

The records are analyzed based on hierarchical levels. The stand-alone and parent level is referred to as Level 0. The first child or subordinate level is Level 1 and a subordinate record of a subordinate record is referred to as Level 2. Records at the same hierarchical level are referred to as peer records while peer records that have the same parent record are sibling records. At Level 0, peer records are a combination of stand-alone records and parent records. For the purposes of automated disambiguation, a threshold level or tier may need to be established whereby returned records having a hierarchy level higher than the threshold level or tier will not be subject to the automated disambiguation. For the embodiment shown in FIG. 3, the threshold level has been set to three levels or tiers of record hierarchy. Shown below are three sample records illustrating the three tiers of records.

Tier One
Parent
Child 1
Child 2
Child 3
Child 4
Tier Two
Parent
Child 1
   Subordinate 1.1
   Subordinate 1.2
Child 2
   Subordinate 2.1
   Subordinate 2.2
Tier Three
Stand-Alone 1
Stand-Alone 2
Parent 1
Child 1.1
   Subordinate 1.1.1
Child 1.2
   Subordinate 1.2.1
   Subordinate 1.2.2

Parent 2
Child 2.1
Child 2.2
   Subordinate 2.2.1
   Subordinate 2.2.2
Child 2.3
   Subordinate 2.3.1

With respect to disambiguation and the three levels or tiers, disambiguation occurs first among the parent or stand-alone level, next among the child level, and last among the subordinate level. In alternate embodiments, the number of levels of record hierarchy may be less than three or more than three. The addition of a tier or level requires an additional dialogue or prompt between directory assistance system 10 and the caller and the caller's satisfaction decreases with each additional prompt because the caller is spending longer than the caller desires to spend interacting with an automated system.

For discussion of FIGS. 3, 4, and 5, assume that the caller is seeking information regarding Johnson Auto Mart. Search engine 32 has performed a search of FRL database 22 and/or D1 database 20 using "Johnson Auto Mart" as the search term and returned the following returned records:

| Johnson Auto Mart | 2715 N. Umbridge | 512-555-8700 |
|---|---|---|
| Sales | | 512-555-8710 |
| Service | | 512-555-8720 |
| Trucks | | 512-555-8730 |
| Used Cars | 2750 N. Umbridge | 512-555-8740 |
| Johnson Auto Mart | 325 E. Beanna | 512-555-9600 |
| Parts | | 512-555-9640 |
| Service | | 512-555-9630 |

The automated disambiguation strategy takes into account the hierarchical structure and relationships of and among the returned records. Starting at the lowest level and continuing through successively higher levels, directory assistance system 10 and disambiguation engine 34 disambiguate among returned records either by a name field or an address field.

When automatically disambiguating between more than one returned record, disambiguation engine 34 first determines which one of the stand-alone and parent (Level 0) records is desired by the caller. If the caller's target is a parent record having more than one child record, disambiguation engine 34 then selects the child and finally the child's subordinate record if there is one.

Disambiguation engine 34 attempts to disambiguate a set of returned records by the name field provided each of the returned records have a name and that name is unique. If each name is not unique, then disambiguation engine 34 disambiguates the returned records using the address data field using street name or street name and building number if each street name is not unique. Returned records where the name data field identifies the entity only by store number are not used so that disambiguation would first be by address.

When search engine 32 returns more than one returned record at step 100, 114, or 126, the process continues to step 150 with automated disambiguation. At step 150, disambiguation engine 34 takes the hierarchical level of the topmost record as the initial level (Level 0) on which to disambiguate returned records. For example, disambiguation engine 34 takes "Johnson Auto Mart" as Level 0. In addition, disambiguation engine 34 also checks each returned record to see if any telephone numbers are flagged as the main telephone number. At step 152, disambiguation engine 34 scans each of the returned records in order to determine if the first returned record stands alone or has peers. If there is more than one record at this level, then the process continues to step 154 where the loop count is incremented by one. For example, there are two returned records at Level 0 so the process continues to step 154. If search engine 32 had only returned the first Johnson Auto Mart record, then at step 152 the process would continue to step 158. At step 156 disambiguation engine 34 checks to see if the loop count exceeds four and if it does, the call defaults to a live operator. But if the loop count does not exceed four, then the process continues to step 160.

At step 160, disambiguation engine 34 checks each returned record for particular record information and if found, omits the particular record information from the returned record. For example, disambiguation engine 34 removes from the returned records listings within the returned records such as "Fax No.," "If No Answer Dial," "If Busy Dial," "Toll-Free Dial," or any other appropriate extra listing information. Disambiguation engine 34 checks each record for professional designation or name information that indicates a medical or emergency response personnel or facility and does not omit the above telephone numbers for those records. At step 162 disambiguation engine 34 determines if omitting returned record information at step 162 reduces the number of returned records to one. If the number of records is reduced to one at step 162, then disambiguation engine 34 selects the remaining returned record at step 164 and the process continues to step 158.

If the number of returned records is not reduced to one at step 162, then at step 166 disambiguation engine 34 checks each returned record to determine if each returned record has a name in the name data field. If each returned record does not have a name in the name data field, then the process continues to step 184. If each returned record does have a name, then at step 168 disambiguation engine 34 checks to see what hierarchical level the returned records are at. If the level is Level 0, then the process continues to step 172. Given the example of Johnson Auto Mart, the hierarchical level is Level 0. If the level is greater than Level 0, the process continues to step 170 where disambiguation engine 34 checks each name to determine if the name is an allowable name for disambiguation. Some records include in the name data field a "Store No. XX" or "No. XX" as the name and since generally most callers do not know individual store numbers, it would not be very helpful to the caller to disambiguate by store number. Therefore if the name data fields contain non-allowable names such as "Store No.," the process continues to step 184 where disambiguation engine 34 disambiguates the returned records using address or department information.

When all names are allowable, at step 172 disambiguation engine 34 determines if the name in the name data field is unique for each returned record. If each name is unique, then disambiguation engine 34 proceeds to disambiguate using the name data field as shown in FIG. 4. If each record does not have a unique name at step 172, as with Johnson Auto Mart, then the process continues to step 174 where disambiguation engine 34 checks the returned records having identical names in order to determine if the returned records having identical names are duplicate records. If the returned records having identical names are duplicate records, then disambiguation engine 34 retains the first record and discards all other duplicate records. For Johnson Auto Mart the returned records are not duplicative because even though the records have the same name, the records have different addresses and different phone numbers. At step 176, disambiguation engine 34 checks the number of returned records to determine if the duplicative actions taken at step 174 have reduced the number of returned records to one. If the number of returned records is reduced to one, then at step 180 disambiguation engine 34 selects the remaining returned record and the process continues to step 158.

If there are still more than one returned records at step 176, at step 178 disambiguation engine 34 checks again to see if the returned records each have a unique name. If the returned records have unique names, then the process continues to FIG. 4 where disambiguation engine 34 disambiguates using the name data field. With Johnson Auto Mart the returned records do not have unique names so the process continues to step 182 where disambiguation engine 34 determines if any name occurs more than once among the current set of returned records. If there is more than one name at step 182, then disambiguation engine 34 disambiguates among the returned records using the name data field as shown in FIG. 4.

For Johnson Auto Mart there is not more than one name at step 182, so the process continues to step 184 where disambiguation engine 34 checks each returned record to determine if each returned record has an address. If each returned record does not have an address, then at step 184 the call defaults to a live operator. But if each returned record has an address, then at step 186 disambiguation engine 34 determines if each returned record has a unique address. Disambiguation engine 34 determines if each address is unique by looking at both the street name and building number of the address data field. For Johnson Auto Mart, each returned record has a unique address because one Johnson Auto Mart is located at 2715 N. Umbridge and the other one is located at 325 Beanna. Therefore, the process continues to step 194 of FIG. 5. If the returned records do not have unique addresses at step 186, then at step 188 disambiguation engine 34 checks each returned record to determine if the returned records having the same address are duplicates and can therefore be eliminated as was done above with respect to duplicate names. At step 190 disambiguation engine 34 determines the number of returned records remaining after eliminating any duplicate returned records if only one returned record is left, disambiguation engine 34 selects that returned record at step 192. If at step 190 more than one returned record remains, then the process continues to step 194 of FIG. 5.

At step 194 disambiguation engine 34 loads one or more grammars for speech recognition into directory assistance system 10 for the locations for each returned record at the current hierarchical level. The grammars allow for an ASR engine to recognize the correct response to a prompt provided by the caller. For instance, if the caller is to select a business on Elm Street or Main Street by speaking the desired street name, the grammars allow the ASR engine to determine if the caller utters "Elm" or "Main." Disambiguation engine 34 checks each of the returned records for a main number at step 196 and if disambiguation engine 34 locates a main number, the phrase "main number" is also added to the grammars at step 198 so that the ASR engine will correctly recognize "main number" if the caller requests the main telephone number.

Disambiguation engine 34 begins playing the disambiguation prompts to the caller at step 200. At step 200, disambiguation engine 34 checks the number of returned records at the current hierarchical level and at step 202 checks to determine if the returned records are on the same street or are on different streets. If the returned records are on different streets, then at step 206 disambiguation engine 34 checks the hierarchical level and proceeds to step 208 if the hierarchical level is Level 0 or Level 1. If the returned records are on the same street, then at step 204 disambiguation engine 34 plays a prompt and the caller hears a prompt such as, "There are two locations on Main Street." If the returned records are on different streets, as with Johnson Auto Mart, then at step 208 disambiguation engine 34 plays a prompt and the caller hears, "There are two locations for Johnson Auto Mart." At step 210 if the caller provides any response or utterance other than an affirming response ("Yes") to the playing of the entity name, here Johnson Auto Mart, the call defaults to a live operator.

After step 204 and if the caller is silent or affirms at step 210, the process continues to step 212 where disambiguation engine 34 determines the number of returned records to disambiguate. How disambiguation engine 34 presents and disambiguates the returned records to the caller depends on the number of returned records using a low threshold and a high threshold. In the embodiment shown in FIG. 5 (as well as FIG. 4), the high threshold is set at five returned records and the low threshold is set at two or three returned records. Switch 214 allows disambiguation engine 34 to vary the low threshold. In the example embodiment disambiguation engine 34 can vary the low threshold between two and three. In alternate embodiments, the high threshold may be higher or lower than five and the low threshold maybe lower than two or higher than three.

If there are more than five returned records at step 212, then disambiguation engine 34 prompts the caller for additional information at step 216. Since disambiguation is occurring by address, at step 216 disambiguation engine 34 prompts the caller for the street name for the listing the caller is desiring. For example, if there are six listings for Bob's Wholesale Tools and the caller wants the telephone number for the location on Elm Street, at step 216 disambiguation engine 314 prompts the caller for the street name and the caller responds with "Elm Street." At step 218 disambiguation engine 34 receives the additional information from the caller utilizing speech recognition and at step 220 determines if the street name provided by the caller is a unique location corresponding with one of the returned records.

If the street provided by the caller is unique, then disambiguation engine 34 selects the returned record having the street name matching the street name provided by the caller at step 192. If the street name provided by the caller is not a unique location among the returned records, then the process returns to step 194 and the steps following step 194 are repeated with respect to the street name provided by the caller until there is a successful disambiguation or until the call defaults to the operator. If the street name provided by the caller at step 218 does not match any of the street names of the returned records, the process continues to step 222 where disambiguation engine 34 checks to see if there is a main telephone number. If there is a main telephone number, disambiguation engine 34 provides the main telephone number to the caller at step 224 so long as the main telephone number is not on a non-publication list. If there is not a main telephone number at step 222, then the call defaults to a live operator.

If the number of returned records at step 212 is between the low threshold and the high threshold, then at step 226 disambiguation engine 34 provides to the caller a pick list of the locations that were loaded in the grammar. Disambiguation engine 34 plays a prompt listing the name and address for each returned record and prompts the caller to pick the desired returned record when the caller hears it by saying "that one." The caller picks the desired returned record at step 228. If the caller hears the desired returned record in the pick list, the process continues to step 192 where disambiguation engine 34 selects the returned record selected by the caller at step 228. If the caller does not hear the desired returned record in the pick list, the call defaults to a live operator.

For instance, if there are four returned records for John Smith, disambiguation engine 34 plays the following pick list for the caller: "There are four locations for John Smith. When you hear the one you want, say 'that one:' on Cedar {pause}, on Shoal Creek {pause}, on 30$^{th}$ Street {pause}, or on Congress {pause}." If the caller wants John Smith on Cedar, then after the caller hears "John Smith on Cedar" the caller says "that one" and does not hear the rest of the choices in the pick list. The caller may also say "on Cedar" or "the first one" instead of "that one."

If the number of returned records at step 212 is below the low threshold, then at step 230 disambiguation engine 34 provides the caller a direct choice. For the Johnson Auto Mart example, disambiguation engine 34 plays the following prompt: "Do you want the one on Umbridge or on Beanna" and the caller responds with either "Umbridge" or "Beanna." At step 232 the caller selects the desired returned record by stating the street name of the one the caller wants. When the caller correctly selects a returned record, disambiguation engine 34 selects that returned record at step 192. For example, the caller is looking for the phone number for the Johnson Auto Mart on Umbridge so in response to the prompt, the caller says "Umbridge" and disambiguation engine 34 selects the returned record for Johnson Auto Mart on Umbridge. If the caller does not hear the location that the caller desires or the caller is not aware of more than one location and therefore does not know which location to pick at step 232, then at step 222 disambiguation engine 34 checks to see if there is a main telephone number and provides the main telephone number to the caller at step 224. Since there is no main telephone number for Johnson Auto Mart, if the caller fails the disambiguation at step 232, the call defaults to a live operator at step 222.

Once disambiguation engine 34 selects a returned record, the process returns to step 158. At step 158 disambiguation engine 34 determines if the selected returned record includes any subordinate records. If the returned record has no subordinate records, then the process continues to step 234. But if the returned record has one or more subordinate records, as with Johnson Auto Mart on Umbridge, the process continues to step 236 where disambiguation engine 34 determines if the parent record has an associated telephone number. If the parent record does not have a telephone number, then the process continues to step 242. If the parent record has a telephone number, as with Johnson Auto Mart, then at step 238 disambiguation engine 34 determines if a main telephone number has already been flagged for the selected returned record. If no main number has been flagged, then at step 240 disambiguation engine 34 flags the telephone number of the parent record as the main number.

Once the main telephone number has been identified and/or flagged, at step 242 disambiguation engine 34 increments the hierarchical level one level, in this example to Level 1, and at step 244 disambiguation engine 34 determines if there are more than one records at hierarchical Level 1. If there is only one record at this hierarchical level, then at step 246 disambiguation engine 34 selects this returned record and the process returns to step 158. If there is more than one record at step 244, as with Johnson Auto Mart, then at step 248 disambiguation engine 34 determines if each of the subordinate records at this level have the same telephone number. If the subordinate records all the have the same telephone number, then disambiguation engine 34 flags the subordinate records as having the same telephone number and the process continues to step 234. If at step 248 the subordinate records do not have the same telephone number, then the loop count is incremented and checked at steps 154 and 156 and the process continues to step 160 where step 160 through step 166 are repeated as described above.

For Johnson Auto Mart on Umbridge, disambiguation engine 34 determines that all the returned records have names at step 166, the names are allowable at step 170, and that the names are all unique at step 172. Since the names are all unique at step 172, the process continues to step 252 and FIG. 4.

At step 252 disambiguation engine 34 determines the current hierarchical level. If the current level is Level 0, then at step 256 disambiguation engine 34 loads the grammar with the names and the addresses for the peer returned records. If the current level is Level 1, as with Johnson Auto Mart, disambiguation engine 34 loads the grammar with only the names of the peer returned records at hierarchical Level 1 at step 254. At step 258 disambiguation engine 34 checks for a main telephone number and adds the phrase "main number" to the grammars at step 260 if there is a main telephone number. There is a main telephone number for Johnson Auto Mart which is flagged as the main telephone number at step 240.

Disambiguation engine 34 again determines the hierarchical level at step 262 and if the level is not Level 0, disambiguation engine 34 checks for any indicators in the name data field of the returned records at step 264. The "Sales," "Service," "Trucks," and "Used Cars" names include department indicators with respect to the name data field so that at step 266 disambiguation engine 34 plays the following prompt to the caller: "There are four departments listed." The name field indicator allows disambiguation engine 34 to know whether the returned records are for department names, individuals first or last names, business names, or any other appropriate name indication. Because the name indicator is department for Johnson Auto Mart, disambiguation engine 34 uses "department" in the prompt at step 266. Because the loop count is greater than one and the caller has already been through one disambiguation to select the location and is aware of the returned record entity name, there is no need to provide the entity name at step 270.

Once disambiguation engine 34 plays the prompt and as long as the caller does not respond (implicit confirmation) or affirms ("Yes"), the process continues to step 272. If the caller negates ("No") or says anything else (out of grammar) which would cause directory assistance system 10 to look up a wrong listing, the call defaults to a live operator.

At step 272, disambiguation engine 34 determines the number of returned records and disambiguates in the same manner as described with respect to steps 212 through 232. If the number of returned records is below the low threshold determined using switch 275, then at step 274 disambiguation engine 34 provides the caller a direct choice between the returned records. If the caller hears the desired returned record at step 274 and successfully selects it at step 276, then disambiguation engine 34 selects the desired returned record at step 193. If the caller does not successfully select the desired returned record at step 276, then at step 278 disambiguation engine 34 checks for a main telephone number and provides the main telephone number to the caller at step 280 if there is a main telephone number or defaults to a live operator if there is not a main telephone number.

If the number of returned records at step 272 is greater than the high threshold, then at steps 282 and 284 disambiguation engine 34 requests additional information from the caller in order to determine which returned record is desired by the caller. If the caller provides additional information (such as one of the names loaded in the grammar) that allows disambiguation engine 34 to determine which returned record is desired by the caller at step 284, then disambiguation engine 34 selects the desired returned record at step 193. If the caller does not provide additional information that allows disambiguation engine 34 to select the desired returned record at step 284, disambiguation engine 34 checks for a main telephone number at step 278 and provides the main telephone number if there is one at step 280 or defaults to a live operator if there is not a main telephone number.

If the number of returned records is between the low and the high threshold, then disambiguation engine 34 provides a pick list based on the names that were loaded in the grammar. At step 286 disambiguation engine 34 plays each name followed by a pause. The pause allows for time for the caller to select the desired returned record. For Johnson Auto Mart for example, disambiguation plays the following prompt: "When you hear the one you want, say 'that one:' Sales {pause}, Service {pause}, Trucks {pause}, or Used Cars {pause}." At step 288 the caller responds with "that one" when the caller hears the department that the caller is interested in. If the caller wants the telephone number for service, then after the caller hears "Service," the caller says "that one," "Service," or "the second one." Disambiguation engine 34 recognizes the caller's response and selects the returned record at step 193 correlating to the caller's response. If the caller does not successfully pick a returned record from the pick list, the call defaults to a live operator.

Once disambiguation engine 34 selects the desired returned record at step 193, the process returns to step 158 where disambiguation engine 34 determines if the selected returned record has any subordinate records. If the caller desired the number for the Service Department at Johnson Auto Mart then that returned record has no subordinate records and the process continues to step 234.

At step 234, disambiguation engine 34 determines if there is a parent record for the selected returned record and if so, if the parent record is flagged as the main telephone number. With Johnson Auto Mart, the parent record is flagged as the main telephone number so at step 290 disambiguation engine 34 checks if all the subordinate records have the same telephone number. If the subordinate records all have the same telephone number, disambiguation engine 34 offers the caller the main number at step 292 and plays the main telephone number for the caller (if not on a non-publication list) at step 294 if the caller responds that he wants the main telephone number. If the caller does not want the main telephone number at step 292, then disambiguation engine 34 provides the telephone number selected at step 193 to the caller at steps 296 and 298.

If at step 290 the subordinate records do not have the same telephone number, as with Johnson Auto Mart, then at step 300 disambiguation engine 34 determines if the number of subordinate records is greater than one. If there are more than one subordinate records at step 300, then at step 302 disambiguation engine 34 provides the telephone number to the caller for the returned record selected at step 193 as long the returned record is not on a non-publication list. If there is only one subordinate record at step 300, at step 304 disambiguation engine 34 offers the caller the option of the main telephone number or the telephone number for the one subordinate record. If the caller wants the main telephone number, disambiguation engine 34 plays the main telephone number at step 306 so long as it is not on a non-publication list. Disambiguation engine 34 plays the subordinate record telephone number at step 302 if the caller does not want the main telephone number at step 304.

The disambiguation process occurs instantaneously with respect to the caller. When the caller calls directory assistance and states that he wants the number for Johnson Auto Mart, the next prompt the caller hears is "There are two locations for Johnson Auto Mart. Do you want the one on Umbridge or on Beanna?" When the caller responds "Umbridge," the next prompt the caller hears is "There are four departments listed. When you hear the one that you want, say 'that one:' Sales {pause}, Service {pause}, Trucks {pause}, or Used Cars {pause}." The caller responds "that one" after hearing "Service" and the next prompt the caller hears is "The telephone number for the Service department for Johnson Auto Mart on 2715 N. Umbridge is 512-555-8720." When providing the desired telephone number and corresponding location, the building number for the location may be included if there are two or more locations on the same street.

Despite the ease of use of directory assistance system 10 and the automated disambiguation strategy, there are instances when a caller experiences difficulty in dealing with directory assistance and needs the assistance of a live operator. Directory assistance system 10 incorporates automated procedures for defaulting to a live operator when a caller experiences particular errors within directory assistance.

Throughout all the process described above, track engine 36 tracks and stores in database 24 each utterance spoken by the callers interacting with directory assistance. In addition, error engine 38, in association with track engine 36, determines when an utterance spoken by the caller initiates an error condition. Upon the occurrence of the error condition, error engine 38 puts the caller on hold, connects to a live operator, plays for the operator the utterance causing the error condition (the error utterance) and the utterance preceding the error utterance (the preceding utterance), and then the operator is connected to the caller.

As shown in FIGS. 3, 4, and 5, there are instances when the caller fails to successfully respond to a disambiguation prompt and the call defaults to the operator. In addition to those instances, error engine 38 also allows for the call to default to the operator when the caller fails to successfully reply to any prompt at any stage within directory assistance.

Directory assistance system 10 utilizes speech recognition to interact with the callers. When a caller provides input using speech, the speech recognition software recognizes the caller's utterance with a certain degree or level of confidence. Caller's utterances can be recognized with a high level of confidence, a medium level of confidence, and a low level of confidence. Unique methods may be used to establish and maintain the threshold levels for what is the high confidence level, the medium confidence level, and the low confidence level. Callers' utterances recognized with a medium or low level of confidence may be enough for error engine 38 to transfer the callers to the operator. When track engine 36 tracks and stores each utterance, track engine 36 may also store the confidence level with which the utterance was recognized.

When the caller provides an utterance, track engine 36 stores the utterance in database 24 and error engine 38 monitors the utterance to determine if the utterance causes an error condition. An error condition is an event causing an error in interacting with directory assistance and results in the caller transferring to a live operator. Error engine 38 has different requirements for what types of caller utterances will cause an error condition and caller utterances in response to a prompt may be in error for different reasons. For example, a caller might say nothing in response to a prompt (TO—no speech time out), begin speaking before the prompt is done playing (STE—spoke too early), speak for so long that there is too much speech for the speech recognition software to recognize (TMS—too much speech), say something that the speech recognition software cannot understand (OOG—out of grammar), or try to respond using touch-tone input instead of speaking (TTD—touch tone digit). An error condition occurs on the occurrence of any permutation of two TO or STE results or on the single occurrence of a TMS, a TTD, or an OOG result. For example, directory assistance system 10 prompts the caller for residential, business, or government and the caller presses buttons trying to spell business in response to the prompt. Error engine 38 recognizes this as a TTD result and defaults the caller to the operator. In alternate embodiments, additional events or conditions as well as various permutation and numbers of errors may cause an error condition.

When the caller satisfies an error condition either as described above or within the disambiguation process as shown in FIGS. 3, 4, and 5, at step 130 error engine 38 populates operator screen 30 with the caller's utterances spoken before the error utterance that were recognized with high confidence. For example, at step 120 directory assistance system 10 cannot understand the caller's utterance in response to the prompt for business name. Error engine 38 recognizes this as a condition satisfying an error condition and therefore transfers the caller to the operator. But prior to the error at step 120, the caller had successfully interacted with directory assistance system 10 and provided locality information at step 92 and "business" at step 118. Track engine 36 stored the caller's utterance to the locality prompt and the RBG prompt. Error engine 38 accesses database 24 and populates city field 40 and state field 42 with the information provided by the caller's utterances. Because the caller had made it to step 120 in the automated system, all the caller's utterances up to the error had to have been recognized with a high confidence level. By populating operator screen 30 with information from the caller's utterances recognized with high confidence, the operator knows some of what the caller is seeking and does not have to ask the caller to repeat what the caller has already successfully provided.

In addition to populating operator screen 30 with information from the utterances recognized with high confidence, at step 132 error engine 38 plays to the operator the preceding utterance, which was recognized with high confidence and no error, and the error utterance causing the error condition. Playing of both the error utterance and the preceding utterance allows the operator to understand the intention of the caller's inquiry and where the inquiry went wrong without having to re-ask the caller numerous questions the caller may have already answered.

Error engine 38 does not provide the immediately preceding utterance if the preceding utterance is a generic utterance. A generic utterance is an utterance that has little meaning to the operator outside of the prompt to which the generic utterance was in response to. Generic utterances include such utterances as "that one, " "yes,", or "no" when following a pick list or a "which one" prompt or in response to a confirmation prompt. When the immediately preceding utterance is a generic utterance, error engine 38 omits the generic utterance and plays to the operator the error utterance and the most immediately preceding utterance that is not a generic utterance. For instance, the caller is prompted for the locality and responds "Austin." The following prompt asks the caller to say "yes" if Austin is the desired locality. The caller says "yes" and the caller is prompted for business, residential, or government. The caller responds "I need a plumber." The caller's response to the RBG prompt is in error and the "I need a plumber" utterance is the error utterance. The utterance preceding the error utterance is "yes" but since that is a generic utterance, error engine 38 goes back one utterance to "Austin" and plays to the operator: "Austin. I need a plumber."

For an error condition occurring during disambiguation for a pick list, error engine 38 populates operator screen 30 with the search terms provided by the caller and omits and does not play for the operator the "that one" utterance in response to the pick list because it would be meaningless to the operator. For a default during disambiguation for either a direct choice or a request for additional information, error engine 38 populates operator screen 30 with the search terms and plays the error utterance and preceding utterance because both of those utterances will have meaning to the operator since those utterances will not be generic utterances.

In addition to omitting generic utterances, error engine 38 can also combine two utterance into one utterance for operator playback purposes. For example, a prompt may ask for the city, and another prompt for the state. The caller replies with two utterances—one for the city and one for the state. If the both the city and state utterances are recognized with high confidence and no error, then error engine 38 may combine the city and state utterances into one utterance when playing back utterances to the operator on the occurrence of an error condition. For example, the caller is prompted for the city and replies "Austin" and is prompted for the state and replies "Texas." The caller is next prompted for the name and the caller replies "business." The error utterance is "business" and error engine 38 combines the "Austin" utterance with the "Texas" utterance into one utterance and plays "Austin, Tex., Business" to the operator.

In addition to city and state utterances, error engine 38 may also combine a first name utterance and a last name utterance into a single utterance for playback to the operator. For instance, if the caller provides the last name and then the first name in two separate utterances and then an error occurs on the next utterance, error engine 38 plays to the operator the combined first and last name as the preceding utterance.

Before error engine 38 begins to play the error utterance and the preceding utterance to the operator, error engine 38 plays a first tone to the operator to alert the operator that the error utterance and the preceding utterance are preparing to play. Error engine 38 plays a second tone when the error utterance and the preceding utterance finish playing and when error engine 38 is preparing to bring the caller online with the operator. The second tone signals the operator to begin speaking with the caller so that caller does not think the line is dead and therefore hangs up.

Once error engine 38 populates operator screen 30 and plays the error utterance and the preceding utterance for the operator, at step 134 the caller is brought online with the operator and the operator and caller continue the dialogue that the caller started with the automated directory assistance. Before error engine 38 connects the caller to the operator, error engine 38 highlights the information fields 40-52 in operator screen 30 that error engine 38 populated with information from the caller's utterances. Error engine 38 also highlights the information fields 40-52 in operator screen 30 that need to be filled in with information from the caller before the operator can perform a search for the desired returned record and telephone number. Therefore, the operator immediately knows what additional information to elicit from the caller. The populated operator screen 30 allows the operator to know what questions the caller has already answered and prevents the operator from asking the caller to repeat answers which callers typically hate to do. In addition, playing the error utterance and the preceding utterance allows the operator to know what the caller is trying to accomplish and where the caller ran into trouble. Because the operator knows all this before the caller connects with the operator, less time is required in the caller/operator dialogue because the operator knows exactly what questions to ask and does not have to repeat any questions that have already been successfully answered.

When the operator has gathered from the caller all the necessary information to perform a search, at step 136 the operator access and searches D1 database 20 and locates zero or one or more returned records. If the operator locates more than one returned record matching the search terms, the operator manually disambiguates at step 138 by asking the caller additional questions and the caller selects the desired returned record. Once the caller has selected the desired returned record, at step 140 the operator provides the telephone number to the caller as long as the returned record is not on a non-publication list.

For example, when a caller calls directory assistance wanting the number for Auto Tech, the caller is prompted for city locality and the caller responds "Austin." Track engine 36 stores "Austin" in database 24. The caller is prompted for state locality, the caller replies "Texas," and track engine 36 stores "Texas" in database 24. The caller is then prompted for business, residential, or government, the caller replies "business," and track engine 36 stores "business." The caller is prompted for the business name, the caller replies "Auto Tech," track engine 36 stores "Auto Tech," and search engine 32 locates two returned records for Auto Tech—one on Main Street and the other on Elm Street. The caller is offered a direct choice between "Main" and "Elm" and the caller responds with "Oak Street." Error engine 38 recognizes "Oak Street" as an error utterance and defaults the caller to the operator. But before the caller connects with the operator, error engine 38 plays to the operator "Auto Tech. Oak Street" and populates city field 40 with "Austin," state field 42 with "Texas," and business name field 48 with "Auto Tech." Once the utterances have played and operator screen 30 populated, the operator begins speaking with the caller and assisting the caller with locating the desired telephone number.

Although the present invention has been described in detail, it should be understood that various changes, substitutions and alterations can be made hereto without the parting from the spirit and scope of the invention as defined by the appended claims.

What is claimed is:

1. A method for providing automated directory assistance, comprising:
    initiating a directory assistance dialog with a user;
    prompting the user for a user utterance;
    detecting a keyword in the user utterance;
    querying a directory assistance database based at least in part on the keyword; responsive to said querying retrieving multiple records from the database, determining hierarchical levels associated with the retrieved records; and
    disambiguating the retrieved records based at least in part on the hierarchical levels including disambiguating a subset of the retrieved records, wherein the retrieved records in the subset share a common hierarchical level.

2. The method of claim 1, wherein said disambiguating identifies a single parent record associated with a first hierarchical level and wherein said method further comprises disambiguating a plurality of child records of the parent record wherein the child records are associated with a second hierarchical level.

3. The method of claim 2, wherein the first hierarchical level is associated with an entity and wherein the second hierarchical level is associated with a department within the entity.

4. The method of claim 1, wherein the user utterance includes a name utterance and an address utterance.

5. The method of claim 1, further comprising displaying directory assistance search parameters on an operator terminal and forwarding one or more recorded user utterances to an operator for playback in response to a failure to obtain the directory assistance search parameters needed to form a user directory assistance query.

6. A computer program product comprising computer executable instructions, stored on a computer accessible medium, for providing automated directory assistance, said instructions comprising instructions for:
    initiating a directory assistance dialog with a user;
    prompting the user for a user utterance;
    detecting a keyword in the user utterance;
    querying a directory assistance database based at least in part on the keyword;
    responsive to said querying retrieving multiple records from the database, determining hierarchical levels associated with the retrieved records; and
    disambiguating the retrieved records based at least in part on the hierarchical levels including disambiguating a subset of the retrieved records, wherein the retrieved records in the subset share a common hierarchical level.

7. The computer program product of claim 6, wherein the instructions for disambiguating comprise instructions for disambiguating a plurality of child records of the parent record wherein the child records are associated with a second hierarchical level.

8. The computer program product of claim 6, wherein the first hierarchical level is associated with an entity and wherein the second hierarchical level is associated with a department within the entity.

9. The computer program product of claim 6, wherein the user utterance includes a name field and an address field.

10. The computer program product of claim 6, further comprising instructions for displaying directory assistance search terms on an operator terminal and forwarding one or more recorded user utterances to an operator for playback in response to a failure to obtain the directory assistance search parameters needed to form a user directory assistance query.

11. A system including a processor and storage, the storage including processor executable instructions, embedded in the storage, for providing automated directory assistance, said instructions comprising instructions for:
    initiating a directory assistance dialog with a user;
    prompting the user for a directory assistance user utterance;
    detecting the user utterance in response to the prompt;
    identifying one or more directory assistance search terms from the user utterance; querying a database based on the identified search terms;
    responsive to said querying retrieving multiple records from the database, determining hierarchical levels associated with the retrieved records; and
    disambiguating the multiple records based at least in part on the hierarchical levels including disambiguating among a plurality of the retrieved records associated with a first hierarchical level to select a first record, and, responsive to detecting a plurality of retrieved records being child records to the selected first record, disambiguating among the child records to identify a selected child record.

12. The system of claim 11, wherein the user utterances include a name utterance and an address utterance.

13. The system of claim 11, further comprising, responsive to detecting a third plurality of retrieved records are child records of the selected child record, disambiguating among the third plurality of retrieved records.

* * * * *

UNITED STATES PATENT AND TRADEMARK OFFICE
CERTIFICATE OF CORRECTION

PATENT NO. : 7,443,960 B2
APPLICATION NO. : 11/382147
DATED : October 28, 2008
INVENTOR(S) : John M. Martin and Hisao M. Chang It is certified that error appears in the above-identified patent and that said Letters Patent is hereby corrected as shown below:

In the Specification

Please correct the indentation of tiers on the table at Line 41 of Column 7 as follows to reflect the indentation that was submitted in the specification as filed:

| | | |
|---|---|---|
| Steve's Grocery | 549 Bull Creek | 512-555-2522 |
|    Deli | | 512-555-2533 |
|    Produce | | 512-555-2544 |

Please correct the indentation of tiers on the table at Line 7 of Column 10 as follows to reflect the indentation that was submitted in the specification as filed:

| | | |
|---|---|---|
| Johnson Auto Mart | 2715 N. Umbridge | 512-555-8700 |
|    Sales | | 512-555-8710 |
|    Service | | 512-555-8720 |
|    Trucks | | 512-555-8730 |
|    Used Cars | 2750 N. Umbridge | 512-555-8740 |

Please correct the indentation of tiers on the table at Line 23 of Column 10 as follows to reflect the indentation that was submitted in the specification as filed:

| | | |
|---|---|---|
| Smith Foods | | |
|    Store No. 1 | 125 Main Street | 512-555-8500 |
|    Store No. 2 | 7865 Pine | 512-555-9514 |
|    Store No. 3 | 7895 N. Research | 512-555-7532 |

Signed and Sealed this

Seventh Day of September, 2010

David J. Kappos
*Director of the United States Patent and Trademark Office*

CERTIFICATE OF CORRECTION (continued)
U.S. Pat. No. 7,443,960 B2

Please correct the indentation of tiers beginning at Line 44 of Column 10 as follows to reflect the indentation that was submitted in the specification as filed:

Tier One
Parent
        Child 1
        Child 2
        Child 3
        Child 4
Tier Two
Parent
        Child 1
                Subordinate Child 1.1
                Subordinate Child 1.2
        Child 2
                Subordinate Child 2.1
                Subordinate Child 2.2
Tier Three
Stand-Alone 1
Stand-Alone 2
Parent 1
        Child 1.1
                Subordinate Child 1.1.1
        Child 1.2
                Subordinate Child 1.2.1
                Subordinate Child 1.2.2
Parent 2
        Child 2.1
        Child 2.2
                Subordinate Child 2.2.1
                Subordinate Child 2.2.2
        Child 2.3
                Subordinate Child 2.3.1

Please correct the indentation of tiers on the table at Line 26 of Column 11 as follows to reflect the indentation that was submitted in the specification as filed:

| | | |
|---|---|---|
| Johnson Auto Mart | 2715 N. Umbridge | 512-555-8700 |
|     Sales | | 512-555-8710 |
|     Service | | 512-555-8720 |
|     Trucks | | 512-555-8730 |
|     Used Cars | 2750 N. Umbridge | 512-555-8740 |
| Johnson Auto Mart | 325 E. Beanna | 512-555-9600 |
|     Parts | | 512-555-9640 |
|     Service | | 512-555-9630 |

CERTIFICATE OF CORRECTION (continued)
U.S. Pat. No. 7,443,960 B2

In the Claims

Please insert a new paragraph following "keyword;" at Line 43 of Column 21:

1. A method for providing automated directory assistance, comprising:
    initiating a directory assistance dialog with a user;
    prompting the user for a user utterance;
    detecting a keyword in the user utterance;
    querying a directory assistance database based at least in part on the keyword;
    responsive to said querying retrieving multiple records from the database, determining hierarchical levels associated with the retrieved records; and
    disambiguating the retrieved records based at least in part on the hierarchical levels including disambiguating a subset of the retrieved records, wherein the retrieved records in the subset share a common hierarchical level.

Please correct Claim 11 as follows, including inserting a new paragraph following "utterance;" at Line 46 of Column 22:

11. A system including a processor and storage, the storage including processor executable instructions, embedded in the storage, for providing automated directory assistance, said instructions comprising instructions for:
    initiating a directory assistance dialog with a user;
    prompting the user for a ~~directory assistance~~ user utterance;
    detecting the user utterance in response to the prompt;
    identifying one or more directory assistance search terms from the user utterance;
    querying a database based on the identified search terms;
    responsive to said querying retrieving multiple records from the database, determining hierarchical levels associated with the retrieved records; and
    disambiguating the multiple records based at least in part on the hierarchical levels including disambiguating among a plurality of the retrieved records associated with a first hierarchical level to select a first record, and, responsive to detecting a plurality of retrieved records being child records to the selected first record, disambiguating among the child records to identify a selected child record.